(12) United States Patent
Popp et al.

(10) Patent No.: US 8,087,074 B2
(45) Date of Patent: Dec. 27, 2011

(54) ONE TIME PASSWORD

(75) Inventors: Nicolas Popp, Menlo Park, CA (US); David M'Raihi, San Carlos, CA (US); Loren Hart, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 532 days.

(21) Appl. No.: 11/665,027

(22) PCT Filed: Oct. 17, 2005
(Under 37 CFR 1.47)

(86) PCT No.: PCT/US2005/037113
§ 371 (c)(1),
(2), (4) Date: May 6, 2009

(87) PCT Pub. No.: WO2006/044717
PCT Pub. Date: Apr. 27, 2006

(65) Prior Publication Data
US 2009/0313687 A1 Dec. 17, 2009

Related U.S. Application Data

(60) Provisional application No. 60/618,600, filed on Oct. 15, 2004.

(51) Int. Cl.
*G06F 7/04* (2006.01)
*H04L 29/06* (2006.01)
*H04L 9/32* (2006.01)
*G06F 21/00* (2006.01)

(52) U.S. Cl. ............. 726/9; 726/2; 726/4; 726/5; 726/8; 726/16; 726/17; 726/18; 726/20; 726/26; 726/29; 726/30; 726/34; 713/159; 713/161; 713/172; 713/182; 713/184; 713/185; 713/193; 713/194; 713/400; 713/502

(58) Field of Classification Search ................ 726/9, 20; 713/159, 172, 185, 184
See application file for complete search history.

(56) References Cited

U.S. PATENT DOCUMENTS

| | | | | |
|---|---|---|---|---|
| 5,023,908 A * | 6/1991 | Weiss | ............................. | 713/184 |
| 5,168,520 A * | 12/1992 | Weiss | ............................. | 713/184 |
| 5,448,045 A * | 9/1995 | Clark | ............................. | 235/382 |
| 5,661,807 A | 8/1997 | Guski et al. | | |
| 6,067,621 A * | 5/2000 | Yu et al. | ........................ | 713/172 |
| 6,292,896 B1 | 9/2001 | Guski et al. | | |
| 6,370,649 B1 | 4/2002 | Angelo et al. | | |

(Continued)

OTHER PUBLICATIONS

Krawczyk et al, Feb. 1997, RFC 2104, HMAC: Keyed-Hashing For Message Authentication, pp. 1-11.*

(Continued)

*Primary Examiner* — Edan Orgad
*Assistant Examiner* — Jenise Jackson
(74) *Attorney, Agent, or Firm* — Morris & Kamlay LLP

(57) ABSTRACT

A token calculates a one time password by generating a HMAC-SHA-1 value based upon a key K and a counter value C, truncating the generated HMAC-SHA-1 value modulo 10^Digit, where Digit is the number of digits in the one time password. The one time password can be validated by a validation server that calculates its own version of the password using K and its own counter value C'. If there is an initial mismatch, the validation server compensate for a lack of synchronization between counters C and C' within a look-ahead window, whose size can be set by a parameter s.

15 Claims, 2 Drawing Sheets

U.S. PATENT DOCUMENTS

| | | | |
|---|---|---|---|
| 7,058,180 B2* | 6/2006 | Ferchichi et al. | 380/247 |
| 7,069,438 B2* | 6/2006 | Balabine et al. | 713/168 |
| 7,318,235 B2* | 1/2008 | Grawrock | 726/26 |
| 7,805,377 B2* | 9/2010 | Felsher | 705/64 |
| 7,921,455 B2* | 4/2011 | Lin et al. | 726/9 |
| 2003/0163569 A1 | 8/2003 | Panasyuk et al. | |
| 2003/0212894 A1* | 11/2003 | Buck et al. | 713/184 |
| 2003/0217288 A1 | 11/2003 | Guo et al. | |
| 2004/0044896 A1 | 3/2004 | Kelley et al. | |
| 2004/0059952 A1* | 3/2004 | Newport et al. | 713/202 |
| 2005/0239440 A1* | 10/2005 | Chen et al. | 455/411 |
| 2006/0034238 A1* | 2/2006 | Inoue et al. | 370/338 |
| 2006/0041756 A1* | 2/2006 | Ashok et al. | 713/183 |
| 2006/0041759 A1* | 2/2006 | Kaliski et al. | 713/184 |
| 2007/0033265 A1* | 2/2007 | Anderson et al. | 709/217 |

OTHER PUBLICATIONS

Haller et al, Feb. 1998, RFC 2289, One Time Password, pp. 1-20.*
FIPS Pub 198, Mar. 6, 2002, HMAC, InformationTechnology Laboratory.*
Kaliski, Jun. 22, 2004, Password Protection Module U.S. Appl. No. 60/584,997.*
RSA Security, RSA Securid Authenticators, 2004, pp. 1-2.*
M. Bellare, et al.: *Keying Hash Functions for Message Authentication*, Proceedings of Crypto '96, Jan. 25, 1996, LNCS vol. 1109, pp. 1-15.
Krawczyk, et al.: *HMAC: Keyed-Hasing for Message Authentication*, IETF Network Working Group, RFC 2104, Feb. 1997, pp. 1-11.
D. Eastlake, $3^{rd}$, et al.: *Randomness Recommendations for Security*, IETF Network Working Group, RFC 1750, Dec. 2004, pp. 1-30.
S. Bradner: *Key words for use in RFCs to Indicate Requirement Levels*, BCP 14, RFC 2119, Mar. 1997, pp. 1-3.
S. Bradner: *Intellectual Property Rights in IETF Technology*, BCP 79, RFC 3668, Feb. 2004, pp. 1-14.
http://www.openauthentication.org/, OATH—*Initiative for Open Authentication*, retrieved Oct. 17, 2005.
Bart Preneel, et al.: *MDx-MAC and Building Fast MACs from Hash Functions*, Advances in Cryptology CRYPTO '95, Lecture Notes in Computer Science, vol. 963, D. Coppersmith ed., Springer-Verlag, 1995.
http://www.eetimes.com/showArticle.jhtml?articleID=60402150: *Crack in SHA-1 code 'stuns' security gurus*, retrieved Oct. 17, 2005, pp. 1-4.
http://www.schneier.com/blog/archives/2005/02/shal_broken.html.
Bruce Schneier: *SHA-1 Broken*, Feb. 15, 2005, 24 pp.
http://news.com.com/Researchers+Digital+encryption+standard+flawed/2100-1002_3-55, Robert Lemos: *Researchers: Digital encryption standard*, Feb. 16, 2005, 5 pp.
Adi Shamir: *How to Share a Secret*, Communications of the ACM, vol. 22, No. 11, pp. 612-613, Nov. 1979.

* cited by examiner

ONE TIME PASSWORD

This is a 371 national phase application of PCT/US2005/037113 filed 17 Oct. 2005, which claims priority to U.S. Provisional Application No. 60/618,600 filed 15 Oct. 2004, the contents of which are incorporated herein by reference.

FIELD OF THE INVENTION

The field of the invention is computer security, and in particular authentication by one time password.

BACKGROUND OF THE INVENTION

Today, deployment of two-factor authentication remains extremely limited in scope and scale. Despite increasingly higher levels of threats and attacks, most Internet applications still rely on weak authentication schemes for policing user access. The lack of interoperability among hardware and software technology vendors has been a limiting factor in the adoption of two-factor authentication technology. In particular, hardware and software components are often tightly coupled through proprietary technology, resulting in high cost solutions, poor adoption and limited innovation.

In the last two years, the rapid rise of network threats has exposed the inadequacies of static passwords as the primary mean of authentication on the Internet. At the same time, the current approach that requires an end-user to carry an expensive, single-function device that is only used to authenticate to the network is clearly not the right answer. For two factor authentication to propagate on the Internet, it will have to be embedded in more flexible devices that can work across a wide range of applications.

One Time Password is certainly one of the simplest and most popular forms of two-factor authentication for securing network access. For example, in large enterprises, Virtual Private Network access often requires the use of One Time Password tokens for remote user authentication. One Time Passwords are often preferred to stronger forms of authentication such as PKI or biometrics because an air-gap device does not require the installation of any client desktop software on the user machine, therefore allowing them to roam across multiple machines including home computers, kiosks and personal digital assistants.

SUMMARY OF THE INVENTION

In accordance with an embodiment of the present invention a One Time Password algorithm can be implemented by any hardware manufacturer or software developer to create interoperable authentication devices and software agents. The algorithm can be event-based so that it can be embedded in high volume devices such as Java smart cards, USB dongles and GSM SIM cards. The algorithm can be made freely available to the developer community under the terms and conditions of the Internet Engineering Task Force (IETF.)

DETAILED DESCRIPTION

Figure 1:
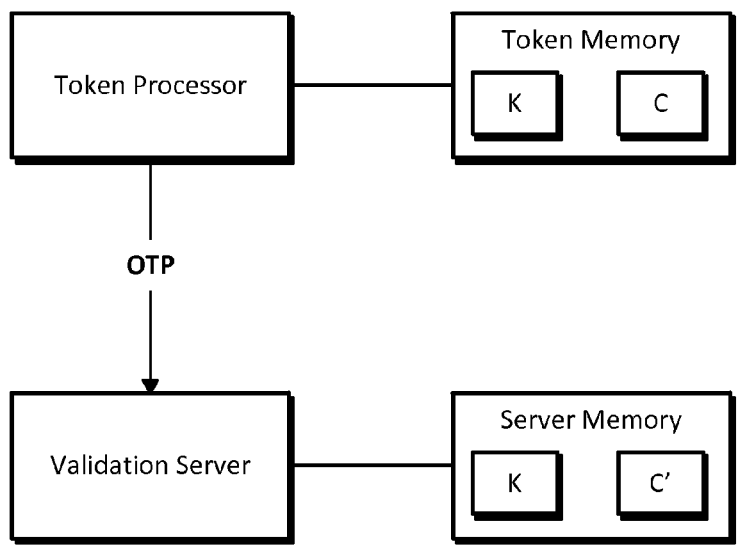
FIG. 1 shows a schematic diagram of an example system according to an embodiment of the invention.
Figure 2:
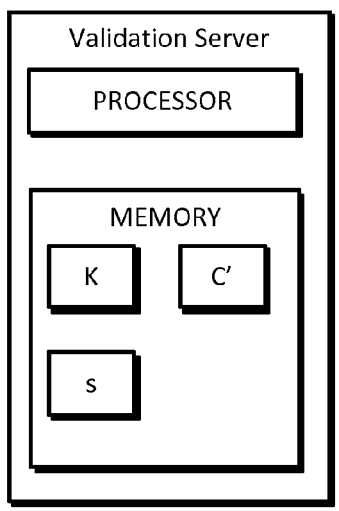
FIG. 2 shows a schematic diagram of an example validation server according to an embodiment of the invention.
Figure 3:
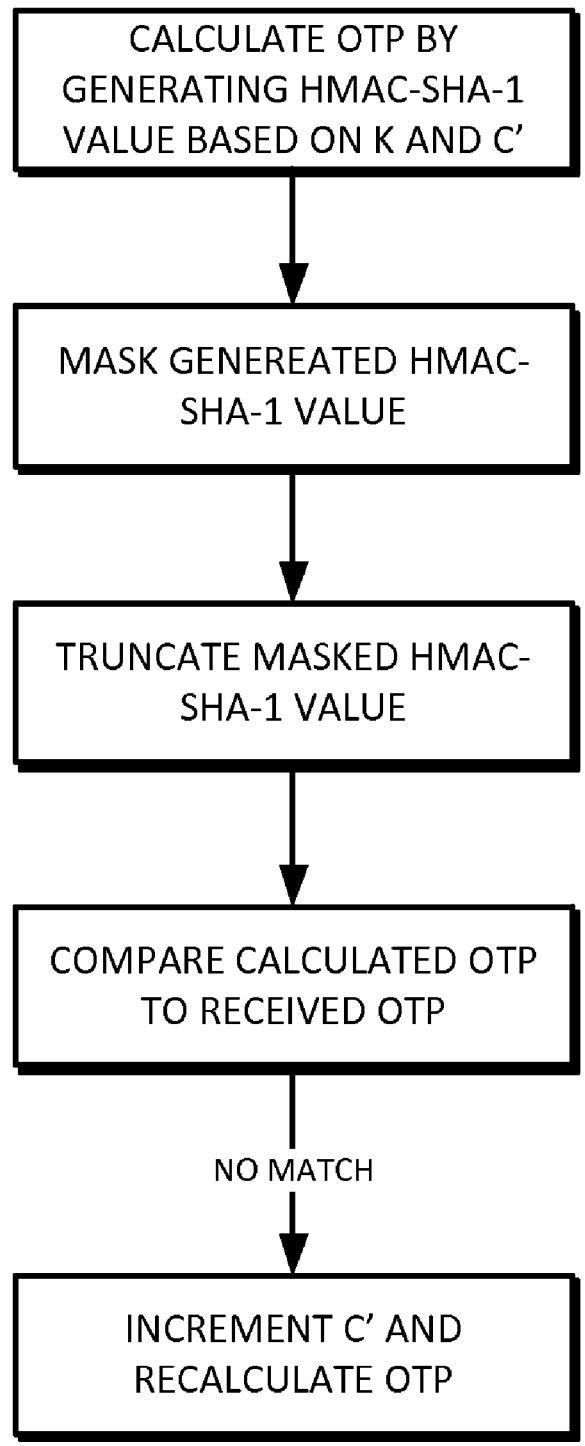
FIG. 3 shows an example process according to an embodiment of the invention.

In accordance with an embodiment of the present invention, the algorithm can be sequence or counter-based and can be economical to implement in hardware by minimizing requirements on battery, number of buttons, computational horsepower and size of the display. It can operate using a token that does not support any numeric input, but can also be used with more sophisticated devices, such as secure PIN-pads.

The value displayed on the token can be easily read and entered by the user into another device, such as a personal computer, cell phone, automated teller machine or any other suitable device. This requires the One Time Password (OTP) value to be of reasonable length. In many cases, the OTP value should be at least a 6-digit value for security reasons. It can be advantageous for the OTP value to be numeric only so that it can be easily entered on devices with simple keypads, such as phones.

There can be user-friendly mechanisms available to resynchronize the counter. The algorithm should use a strong shared secret. To this end, the length of the shared secret can be at 128 bits or longer.

An embodiment of the algorithm in accordance with the present invention is described using the following notation and symbols:

A string means a binary string, meaning a sequence of zeros and ones.

If s is a string, then $|s|$ denotes its length.

If n is a number, then $|n|$ denotes its absolute value.

If s is a string then $s[i]$ denotes its i-th bit. The bits are numbered starting at the bits at 0, so $s=s[0]s[1] \ldots s[n-1]$ where $n=|s|$ is the length of s.

Let StToNum (String to Number) denotes the function which returns the decimal representation of the binary of an input string s. For example, StToNum(110)=6.

The following notation is used for symbols:

C 8-byte counter value, the moving factor. This counter can be synchronized between the OTP generator (e.g., client) and the OTP validator (e.g., server)

K shared secret between client and server. Each OTP generator can have a different and unique secret K T throttling parameter: the server can refuse connections from a user after T unsuccessful authentication attempts, or else send a throttling signal to a recipient indicating an excessive number of validation attempts from a given source s resynchronization parameter: the server can attempt to verify a received authenticator across s consecutive counter values Digit the number of digits in an OTP value, which can be a system parameter The OTP algorithm in accordance with the present invention can be based on an increasing counter value and a static symmetric key known only to the token and the validation service. In order to create the OTP value, the HMAC-SHA-1 algorithm algorithm can be used, as defined in M. Bellare, R. Canetti and H. Krawczyk, "HMAC: Keyed-Hashing for Message Authentication", IETF Network Working Group, RFC 2104, February 1997.

The output of the HMAC-SHA1 calculation is 160 bits, a value that can be truncated to a size that can be easily entered by a user. Thus, $$HOTP(K,C)=\text{Truncate}(HMAC\text{-}SHA\text{-}1(K,C)),$$

where Truncate represents the function that converts an HMAC-SHA-1 value into an HMAC-SHA1 OTP (HOTP) value. The Key (K), the Counter (C) and Data values can be hashed high-order byte first. The HOTP values generated by the HOTP generator can be treated as big endian.

An HOTP value can be generated in 3 distinct steps:

Step 1: Generate an HMAC-SHA-1 value

Let HS=HMAC-SHA-1(K,C), where HS can be a 20 byte string

Step 2: Generate a 4-byte string (Dynamic Truncation)

Let Sbits=DT(HS), which can return a 31 bit string

Dynamic Truncation DT(String) can operate on String=String[0] . . . String[19] as follows:

Let OffsetBits be the low order four bits of String[19]
Offset=StToNum(OffSetBits), where 0<=OffSet<=15
Let P=String[OffSet] . . . String[OffSet+3]
Return the Last 31 bits of P Masking the most significant bit of P can avoid confusion between signed and unsigned modulo computations. Different processors perform these operations differently, and masking out the signed bit can remove ambiguity.

Step 3: Compute an HOTP value

Let Snum=StToNum(S), i.e., convert S to a number in $0 \ldots 2^{31}-1$

Return D=Snum mod 10^Digit, where D is a number in the range $0 \ldots 10^{\{Digit\}}-1$ The Truncate function performs Step 2 and Step 3, i.e. the dynamic truncation and then the reduction modulo 10^Digit. The purpose of the dynamic offset truncation technique is to extract a 4-byte dynamic binary code from a 160-bit (20-byte) HMAC-SHA1 result.

Implementations should extract a at least a 6-digit code. Depending up on security requirements, Digit=7 or more should be considered in order to extract a longer HOTP value.

The following is an example of using this technique for Digit=6, i.e., a 6-digit HOTP value is calculated from the HMAC value. This code example describes the extraction of a dynamic binary code given that hmac_result is a byte array with the HMAC-SHA1 result:

```
int offset = hmac_result[19] & 0xf ;
int bin_code = (hmac_result[offset] & 0x7f) << 24
    | (hmac_result[offset+1] & 0xff) << 16
    | (hmac_result[offset+2] & 0xff) << 8
    | (hmac_result[offset+3] & 0xff) ;
```

SHA-1 HMAC Bytes (Example)

```
-----------------------------------------------------------------
| Byte Number                                                   |
-----------------------------------------------------------------
|00|01|02|03|04|05|06|07|08|09|10|11|12|13|14|15|16|17|18|19|
-----------------------------------------------------------------
| Byte Value                                                    |
-----------------------------------------------------------------
| 1f|86|98|69|0e|02|ca|16|61|85|50|ef|7f|19|da|8e|94|5b|55|5a|
--------------------------------**********--------------------++|
```

* The last byte (byte 19) has the hex value 0x5a.
* The value of the lower four bits is 0xa (the offset value).
* The offset value is byte 10 (0xa).
* The value of the 4 bytes starting at byte 10 is 0x50ef7f19,
  which is the dynamic binary code DBC1
* The MSB of DBC1 is 0x50 so DBC2 = DBC1 = 0x50ef7f19
* HOTP = DBC2 modulo 10^6 = 872921.

We treat the dynamic binary code as a 31-bit, unsigned, big-endian integer; the first byte is masked with a 0x7f. We then take this number modulo 1,000,000 (10^6) to generate the 6-digit HOTP value 872921 decimal.

Any One-Time Password algorithm is only as secure as the application and the authentication protocols that implement it. The parameters T and s can have a significant impact on the security. Truncating the HMAC-SHA1 value to a shorter value makes a brute force attack possible. Therefore, the authentication server should detect and stop brute force attacks. Throttling parameter T, which defines the maximum number of possible attempts for One-Time-Password validation, should be set to a suitably small number. The validation server can manage individual counters per HOTP device in order to take note of any failed attempt. T should not to be too large particularly if the resynchronization method used on the server is window-based and if the window size is large. T should be set as low as possible while not adversely affecting usability too much.

Another option would be to implement a delay scheme to avoid a brute force attack. After each failed attempt A, the authentication server would wait for an increased T*A number of seconds, e.g. say T=5, then after 1 attempt, the server waits for 5 seconds, at the second failed attempt, it waits for 5*2=10 seconds, etc.

The delay or lockout schemes should be across login sessions to prevent attacks based on multiple parallel guessing techniques.

A protocol P for implementing HOTP as the authentication method between a prover and a verifier should have certain properties in the interests of security. P should be two-factor, i.e. something you know (secret code such as a Password, Pass phrase, PIN code, etc.) and something you have (token). The secret code should be known only to the user and should be able to be entered with the one-time password value for the purpose of authentication (two-factor authentication.)

P should not be vulnerable to brute force attacks. This implies that a throttling/lockout scheme should be implemented, e.g., on the validation server side.

P should be implemented with respect to the state of the art in terms of security, in order to avoid the usual attacks and risks associated with the transmission of sensitive data over a public network (privacy, replay attacks, etc.)

The HOTP client (hardware or software token) increments its counter and then calculates the next HOTP value, "HOTP-client." If the value received by the authentication server matches the value calculated by the client, then the HOTP value is validated. In this case, the server increments the counter value by one.

If the value received by the server does not match the value calculated by the client, the server initiate the resynchronization ("resynch") protocol (e.g., using a look-ahead window) before it requests another pass.

If the resynch fails, the server can ask for another authentication pass of the protocol to take place, until the maximum number of authorized attempts is reached.

If the maximum number of authorized attempts is reached the server can lock out the account and initiate a procedure to inform the user that a number of failed attempts was made to access the account.

The HOTP client could also be used to authenticate the validation server, claiming that it is a genuine entity knowing the shared secret. Since the HOTP client and the server are synchronized and share the same secret (or a method to recompute it) a simple 3-pass protocol could be put in place, for example:

1—The end user can enter the TokenID and a first OTP value OTP1;

2—The server can check OTP1 and, if correct, can send back OTP2;

3—The end user can check OTP2 using his HOTP device and, if correct, the server is authenticated and the end user uses the web site.

Obviously, as indicated previously, all the OTP communications should take place over secure (e.g., SSL) connections.

Although the server's counter value is only incremented after a successful HOTP authentication, the counter on the token is incremented every time a new HOTP is requested by the user. Because of this, the counter values on the server and on the token might be out of synchronization.

A look-ahead parameter s can be set on the server, which defines the size of the look-ahead window. The server can recalculate the next s HOTP-server values, and check them against the received HOTP-client. Synchronization of counters in this scenario simply requires the server to calculate the next HOTP values and determine if there is a match. The system can require the user to send a sequence of (say 2, 3) HOTP values for the purpose of resynchronization, since forging a sequence of consecutive HOTP values is even more difficult than guessing a single HOTP value.

The upper bound set by the parameter s ensures the server does not go on checking HOTP values forever (causing a Denial of Service attack) and also restricts the space of possible solutions for an attacker trying to manufacture HOTP values. s should be set as low as possible, while still ensuring usability is not too badly impacted.

The operations dealing with the shared secrets used to generate and verify OTP values should be performed securely to mitigate risks of any leakage of sensitive information. Consider two different avenues for securely generating and storing shared secrets in the Validation system:

1) Deterministic Generation: secrets are derived from a master seed both at provisioning and verification stages and generated on-the-fly whenever it is required; and 2) Random Generation: secrets are generated randomly at provisioning stage, and must be stored immediately and kept secure during their life cycle.

Deterministic Generation

A possible strategy is to derive the shared secrets from a master secret. The master secret can be stored at the server only. A tamper resistant device should be used to store the master key and to derive the shared secrets from the master key and some public information. The main benefit can be to avoid the exposure of the shared secrets at any time and also avoid specific requirements on storage, since the shared secrets could be generated on-demand when needed at provisioning and validation time.

Consider two different cases:

1) A single master key MK is used to derive the shared secrets; each HOTP device has a different secret, K_i=SHA-1(MK,i) where i stands for a public piece of information that identifies uniquely the HOTP device such as a serial number, a token ID, etc. This can be in the context of an application or service. Different application or service providers can have different secrets and settings.

2) Several master keys MK_i are used and each HOTP device stores a set of different derived secrets, {K_i,j=SHA-1(MK_i,j)} where j stands for a public piece of information identifying the device. The active master key could be stored only at the validation server, in the HSM, and keep in a safe place, using secret sharing methods, such as those disclosed in How to Share a Secret, by Adi Shamir. In Communications of the ACM, Vol. 22, No. 11, pp. 612-613, November, 1979. In this case, if a master secret MK_i is compromised, then it would be possible to switch to another secret without replacing all the devices.

The drawback in the deterministic case includes the fact that the exposure of the master secret would obviously enable an attacker to rebuild any shared secret based on correct public information. The revocation of all secrets would be required, or switching to a new set of secrets in the case of multiple master keys.

On the other hand, the device used to store the master key(s) and generate the shared secrets should be tamper resistant. Furthermore, the HSM will not be exposed outside the security perimeter of the validation system, therefore reducing the risk of leakage.

Random Generation

The shared secrets can be randomly generated. A good and secure random source should be selected for generating these secrets. A (true) random generator requires a naturally occurring source of randomness. Practically, there are two possible avenues to consider for the generation of the shared secrets:

1) Hardware-based generators can exploit the randomness which occurs in physical phenomena. An implementation can be based on oscillators and built in such ways that active attacks are more difficult to perform.

2) Software-based generators, although designing a good software random generator is not an easy task. A simple, but efficient, implementation should be based on various sources, and apply to the sampled sequence a one-way function such as SHA-1.

Shared secrets should be stored securely, e.g., by encrypting the shared secrets when stored using tamper-resistant hardware encryption, and exposing them only when required. For example, the shared secret is decrypted when needed to verify an HOTP value, and re-encrypted immediately to limit exposure in the RAM for a short period of time. The data store holding the shared secrets should be in a secure area, to avoid a direct attack on the validation system and the secrets database.

Particularly, access to the shared secrets should be limited to programs and processes required by the validation system only. The protection of shared secrets is of the utmost importance.

The security of the HOTP algorithm can be approximated by the following formula:

$$Sec = sv/10^{Digit}$$

Where:
Sec is the probability of success of the adversary
s stands for the look-ahead synchronization window size;
v stands for the number of verification attempts;
Digit stands for the number of digits in HOTP values.

One can adjust s, T (the Throttling parameter that would limit the number of attempts by an attacker) and Digit until a desired level of security is achieved while still preserving the system usability.

It can be desirable to include additional authentication factors in the shared secret K. These additional factors can consist of any data known at the token but not easily obtained by others. Examples ff such data include:

PIN or Password obtained as user input at the token
Phone number
Any unique identifier programmatically available at the token In this scenario the composite shared secret K is constructed during the provisioning process from a random seed value combined with one or more additional authentication factors. The server could either build on-demand or store composite secrets. In any case, depending on implementation choice, the token can store only the seed value. When the token performs the HOTP calculation it can compute K from the seed value and the locally derived or input values of the other authentication factors.

The use of composite shared secrets can strengthen HOTP-based authentication systems through the inclusion of additional authentication factors at the token. To the extent that the token is a trusted device this approach has the further benefit of not requiring exposure of the authentication factors (such as the user input PIN) to other devices.

The following is an example implementation of the HOTP Algorithm:

```
/*
 * OneTimePasswordAlgorithm.java
 * OATH Initiative,
 * HOTP one-time password algorithm
 *
 */
/* Copyright (C) 2004, OATH. All rights reserved.
 *
 * License to copy and use this software is granted provided that it
 * is identified as the "OATH HOTP Algorithm" in all material
 * mentioning or referencing this software or this function.
 *
 * License is also granted to make and use derivative works provided
 * that such works are identified as
 * "derived from OATH HOTP algorithm"
 * in all material mentioning or referencing the derived work.
 *
 * OATH (Open AuTHentication) and its members make no
 * representations concerning either the merchantability of this
 * software or the suitability of this software for any particular
 * purpose.
 *
 * It is provided "as is" without express or implied warranty
 * of any kind and OATH AND ITS MEMBERS EXPRESSELY
 * DISCLAIMS ANY WARRANTY OR LIABILITY OF ANY
 * KIND relating to this software.
 *
 * These notices must be retained in any copies of any part of this
 * documentation and/or software.
 */
package org.openauthentication.otp; _
import java.io.IOException;
import java.io.File;
import java.io.DataInputStream;
import java.io.FileInputStream ;
import java.lang.reflect.UndeclaredThrowableException;
import java.security.GeneralSecurityException;
import java.security.NoSuchAlgorithmException;
import java.security.InvalidKeyException;
import javax.crypto.Mac;
import javax.crypto.spec.SecretKeySpec;
/**
 * This class contains static methods that are used to calculate the
 * One-Time Password (OTP) using
 * JCE to provide the HMAC-SHA1.
 *
 * @author Loren Hart
 * @version 1.0
 */
public class OneTimePasswordAlgorithm {
    private OneTimePasswordAlgorithm( ) { }
    // These are used to calculate the check-sum digits.
    //                             0 1 2 3 4 5 6 7 8 9
    private static final int[ ] doubleDigits =
                               {0, 2, 4, 6, 8, 1, 3, 5, 7, 9 };
    /**
     * Calculates the checksum using the credit card algorithm.
     * This algorithm has the advantage that it detects any single
     * mistyped digit and any single transposition of
     * adjacent digits.
     *
     * @param num the number to calculate the checksum for
     * @param digits number of significant places in the number
     *
     * @return the checksum of num
     */
    public static int calcChecksum(long num, int digits) {
        boolean doubleDigit = true;
        int total = 0;
        while (0 < digits--) {
            int digit = (int) (num % 10);
            num /= 10;
            if (doubleDigit) {
                digit = doubleDigits[digit];
            }
            total += digit;
            doubleDigit = !doubleDigit;
        }
        int result = total % 10;
        if (result > 0) {
            result = 10 – result;
        }
        return result;
    }
    /**
     * This method uses the JCE to provide the HMAC-SHA1
     * algorithm.
     * HMAC computes a Hashed Message Authentication Code and
     * in this case SHA1 is the hash algorithm used.
     *
     * @param keyBytes   the bytes to use for the HMAC-SHA1 key
     * @param text       the message or text to be authenticated.
     *
     * @throws NoSuchAlgorithmException if no provider makes
     *         either HmacSHA1 or HMAC-SHA1
     *         digest algorithms available.
     * @throws InvalidKeyException
     *         The secret provided was not a valid HMAC-SHA1
     *         key.
     *
     */
    public static byte[ ] hmac_sha1(byte[ ] keyBytes, byte[ ] text)
        throws NoSuchAlgorithmException, InvalidKeyException
    {
//      try {
            Mac hmacSha1;
            try {
                hmacSha1 = Mac.getInstance("HmacSHA1");
            } catch (NoSuchAlgorithmException nsae) {
                hmacSha1 = Mac.getInstance("HMAC-SHA1");
            }
            SecretKeySpec macKey =
                new SecretKeySpec(keyBytes, "RAW");
            hmacSha1.init(macKey);
            return hmacSha1.doFinal(text);
//      } catch (GeneralSecurityException gse) {
//          throw new UndeclaredThrowableException(gse);
//      }
    }
    private static final int[ ] DIGITS_POWER
    // 0 1  2   3    4     5      6       7        8
    = {1,10,100,1000,10000,100000,1000000,10000000,100000000};
    /**
     * This method generates an OTP value for the given
     * set of parameters.
     *
     * @param secret       the shared secret
     * @param movingFactor the counter, time, or other value
     *                     that _changes on a per use basis.
     * @param codeDigits the number of digits in the OTP, not
     *                     including the checksum, if any.
     * @param addCheckSum a flag that indicates if a checksum
     *                     digit should be appended to the OTP.
     * @param truncationOffset the offset into the MAC result to
     *                     begin truncation. If this value is out of
     *                     the range of 0 ... 15, then dynamic
     *                     truncation will be used.
     *                     Dynamic truncation is when the last 4
     *                     bits of the last byte of the MAC are
     *                     used to determine the start offset.
     * @throws NoSuchAlgorithmException if no provider makes
     *                     either HmacSHA1 or HMAC-SHA1
     *                     digest algorithms available.
     * @throws InvalidKeyException
     *                     The secret provided was not
     *                     a valid HMAC-SHA1 key.
     *
     * @return A numeric String in base 10 that includes
```

-continued

```
 * {@link codeDigits} digits plus the optional checksum
 * digit if requested.
 */
static public String generateOTP(byte[ ] secret,
            long movingFactor,
            int codeDigits,
            boolean addChecksum,
            int truncationOffset)
        throws NoSuchAlgorithmException, InvalidKeyException
{
    // put movingFactor value into text byte array
    String result = null;
    int digits = addChecksum ? (codeDigits + 1) : codeDigits;
    byte[ ] text = new byte[8];
    for (int i = text.length - 1; i >= 0; i--) {
        text[i] = (byte) (movingFactor & 0xff);
        movingFactor >>= 8;
    }
    // compute hmac hash
    byte[ ] hash = hmac_sha1(secret, text);
    // put selected bytes into result int
    int offset = hash[hash.length - 1] & 0xf;
    if ( (0<=truncationOffset) &&
        (truncationOffset<(hash.length-4)) ) {
        offset = truncationOffset;
    }
    int binary =
        ((hash[offset] & 0x7f) << 24)
        | ((hash[offset + 1] & 0xff) << 16)
        | ((hash[offset + 2] & 0xff) << 8)
        | (hash[offset + 3] & 0xff);
        int otp = binary % DIGITS_POWER[codeDigits];
    if (addChecksum) {
        otp = (otp * 10) + calcChecksum(otp, codeDigits);
    }
    result = Integer.toString(otp);
    while (result.length( ) < digits) {
        result = "0" + result;
    }
    return result;
    }
}
```

Several enhancements to the HOTP algorithm can be made as variations that could be used for customized implementations.

A simple enhancement in terms of security would be to extract more digits from the HMAC-SHA1 value. For instance, calculating the HOTP value modulo $10^8$ to build an 8-digit HOTP value would reduce the probability of success of the adversary from $sv/10^6$ to $sv/10^8$. This could give the opportunity to improve usability, e.g. by increasing T and/or s, while still achieving a better security overall. For instance, $s=10$ and $10v/10^8=v/10^7<v/10^6$ which is the theoretical optimum for 6-digit code when $s=1$.

Another option is to use A-Z and 0-9 values; or rather a subset of 32 symbols taken from the alphanumerical alphabet in order to avoid any confusion between characters: 0, O and Q as well as 1, l and I are very similar, and can look the same on a small display. The immediate consequence is that the security is now in the order of $sv/32^6$ for a 6-digit HOTP value and $sv/32^8$ for an 8-digit HOTP value. $32^6>10^9$ so the security of a 6-alphanumeric HOTP code is slightly better than a 9-digit HOTP value, which is the maximum length of an HOTP code supported by the proposed algorithm. $32^8>10^{12}$ so the security of an 8-alphanumeric HOTP code is significantly better than a 9-digit HOTP value. Depending on the application and token/interface used for displaying and entering the HOTP value, the choice of alphanumeric values could be a simple and efficient way to improve security at a reduced cost and impact on users.

As for the resynchronization to enter a short sequence (say 2 or 3) of HOTP values, this could be generalized as a concept to the protocol. A parameter L could be added that would define the length of the HOTP sequence to enter. By default, the value L SHOULD be set to 1, but if security needs to be increased, users might be asked (possibly for a short period of time, or a specific operation) to enter L HOTP values. This can be another way, without increasing the HOTP length or using alphanumeric values to tighten security.

The system can also be programmed to request synchronization on a regular basis (e.g. every night, or twice a week, etc.) and to achieve this purpose, ask for a sequence of L HOTP values.

Assuming that the client can access and send not only the HOTP value but also other information, such as the counter value, a more efficient and secure resynchronization method is possible. The client application can send the HOTP-client value and the related C-client counter value, the HOTP value acting as a message authentication code of the counter.

The server accepts if the following are all true, where C-server is its own current counter value:
  1) C-client>=C-server
  2) C-client−C-server<=s
  3) Check that HOTP-client is valid HOTP(K,C-Client)
  4) If true, the server sets C to C-client+1 and client is authenticated In this case, there is no need for managing a look-ahead window anymore. The probability of success of the adversary is only $v/10^6$ or roughly v in one million. A side benefit is obviously to be able to increase s "infinitely" and therefore improve the system usability without impacting the security. This resynchronization protocol can be used whenever the related impact on the client and server applications is deemed acceptable.

Another option can be the introduction of a Data field that would be used for generating the One-Time password values: HOTP (K, C, [Data]) where Data is an optional field that can be the concatenation of various pieces of identity-related information, e.g., Data=Address|PIN.

One could also use a Timer, either as the only moving factor or in combination with the Counter—in this case, e.g. Data=Timer, where Timer could be, e.g., the UNIX-time (GMT seconds since Jan. 1, 1970) divided by some factor (8, 16, 32, etc.) in order to give a specific time step. The time window for the One-Time Password is then equal to the time step multiplied by the resynchronization parameter as defined before—e.g. if we take 64 seconds as the time step and 7 for the resynchronization parameter, we obtain an acceptance window of +/−3 minutes. Using a Data field can make for more flexibility in the algorithm implementation, provided that the Data field is clearly specified.

An embodiment of the present invention can be implemented by a processor coupled to a memory. The processor can be a general purpose microprocessor or an Application Specific Integrated Circuit that embodies as least part of the method in accordance with an embodiment of the present invention in its hardware and/or firmware. The memory can be any device that can store digital information, such as Random Access Memory, a hard disk, flash memory, and the like. The memory can store instructions adapted to be executed by the processor to perform at least part of the method in accordance with an embodiment of the present invention. The processor can be coupled to a network, through which authentication data (such as OTPs and other data) can be sent for verification.

A system for authentication in accordance with the present invention can include a token with a token processor and a token memory and a validation server with a server processor and a server memory. The token processor implements the OTP generation algorithm based upon instructions stored in the token memory. The token memory can also store shared secret K and token counter value C. The validation server processor can implement the OTP validation algorithm based upon instructions stored in the validation server memory and validation server counter value C' and shared secret K also stored in validation server memory. Validation server memory can also store other parameters, such as throttling parameter T, look-ahead window size s, etc.

The token can send its one time password, computed based upon K and C, to the validation server. The validation server can calculate a one time password based upon K and C'. If there is no match, the validation server can calculate the next few one time passwords based upon K and C'+n, where n is an integer from 1 to s. If none of these calculated one time passwords matches the password received from the token, the validation server can send a signal indicating a failed validation attempt. If one of the calculated one time passwords matches the one time password received from the token, the validation server can send a signal indicating a successful validation. The validation server can suspend further validation attempts after T unsuccessful validation attempts, and can alert a system administrator to the effect that a given token is the source of several such failed attempts.

The foregoing description is meant to illustrate, and not to limit, the scope of the present invention. Other embodiments besides those described above would be found to lie within the scope of the invention by one of skill in the art.

What is claimed is:

1. A system for authentication, comprising:
a token processor coupled to a token memory, said token memory storing shared secret key K and token counter value C, said token memory further storing instructions adapted to be executed by said processor to generate a one time password;
a validation server coupled to a validation server memory, said validation server memory storing shared secret key K and validation server counter value C';
said token processor calculating a one time password by:
generating a HMAC-SHA-1 value based upon a key K and a counter value C,
masking the highest-order bit of the generated HMAC-SHA-1 value, and
truncating the masked HMAC-SHA-1 value modulo 10^Digit, where Digit is the number of digits in the one time password; and
sending the one time password to the validation server for validation.

2. The system of claim 1, wherein said validation server memory further stores a look-ahead parameter s, and where said validation server memory instructions are executed by said validation server processor to calculate a one time password based upon K and C'+n, n being an integer from 1 to s, until the one time password calculated by the validation server matches the one time password received from the token or n=s.

3. The system of claim 2, wherein if there is no match between the received one time password and a calculated one time password, then sending a signal indicating a failed validation attempt.

4. The system of claim 2, wherein if there is a match between the received one time password and a calculated one time password, then said validation server processor sending a signal indicating a successful validation.

5. The system of claim 3, wherein said validation server memory further stores a throttling parameter T, and wherein a throttling signal is sent if the number of failed validation attempts is equal to T.

6. The system of claim 1, wherein said validation server memory further stores a throttling parameter T, and wherein further validation attempts are suspended if the number of failed validation attempts is equal to T.

7. A validation server, comprising:
a processor;
a memory coupled to said processor, said memory storing share secret key K, validation server counter value C', look-ahead window parameter s and instructions adapted to be executed by said processor to receive a one time password from a token, calculate a one time password by;
generating a HMAC-SHA-1 value based upon key K and a counter value C', masking the highest-order bit of the generated HMAC-SHA-1 value, and
truncating the masked HMAC-SHA-1 value modulo 10^Digit, where Digit is the number of digits in the one time password and compare the calculated one time password to the one time password received from the token.

8. The validation server of claim 7, wherein if the calculated one time password does not match the one time password received from the token, said validation server calculates one time passwords based upon key K and counter value C'+n, n being an integer from 1 to s.

9. The validation server of claim 8, wherein if the received one time password does not match a calculated one time password, then sending a signal indicating a failed validation attempt.

10. The validation server of claim 8, wherein if the received one time password does not match a calculated one time password, then sending a signal indicating a successful validation.

11. The validation server of claim 8, wherein said memory stores a throttling parameter T, and wherein further validation attempts from the token are suspended after T failed validation attempts.

12. A method for validating a one time password created by a token by generating a HMAC-SHA-1 value based upon a key K and a counter value C, truncating the generated HMAC-SHA-1 value modulo 10^Digit, where Digit is the number of digits in the one time password, comprising:
calculating a one time password to compare to the received one time password by generating a HMAC-SHA-1 value based upon a key K and a counter value C';
masking the highest-order bit of the generated HMAC-SHA-1 value;
truncating the masked HMAC-SHA-1 value modulo 10^Digit, where Digit is the number of digits in the one time password;
comparing the calculated one time password to the received one time password, and if there is no match, then incrementing C' by 1, recalculating the one time password, and if there is still no match, continuing to increment C', recalculating the one time password and comparing the recalculated one time password to the received one time password, until C'=C'+s, where s is a look-ahead window parameter.

13. The method of claim 12, wherein if the calculated or a recalculated one time password matches the received password, sending a signal indicating a successful validation.

14. The method of claim 12, wherein if the calculated or a recalculated one time password matches the received password, sending a signal indicating a failed validation attempt.

15. The method of claim 14, further comprising suspending validation attempts if the number of failed validation attempts exceeds T, a throttling parameter.

* * * * *